US007009725B2

(12) United States Patent
Miyanaga (10) Patent No.: US 7,009,725 B2
(45) Date of Patent: Mar. 7, 2006

(54) ELECTRONIC MAIL COMMUNICATION APPARATUS AND COMMUNICATION METHOD (75) Inventor: Hiroshi Miyanaga, Utsunomiya (JP)

(73) Assignee: Panasonic Communications Co., Ltd., Fukuoka (JP)

(*) Notice: Subject to any disclaimer, the term of this patent is extended or adjusted under 35 U.S.C. 154(b) by 846 days.

(21) Appl. No.: 09/832,107

(22) Filed: Apr. 11, 2001

(65) Prior Publication Data

US 2001/0054075 A1 Dec. 20, 2001

(30) Foreign Application Priority Data

Jun. 12, 2000 (JP) ............... 2000-174954

(51) Int. Cl.
*H04N 1/00* (2006.01)
(52) U.S. Cl. ............... 358/1.15; 358/402; 358/403; 358/407; 709/206
(58) Field of Classification Search ............... 709/206, 709/239; 358/1.15, 407, 403, 402; 714/748; 715/500.1
See application file for complete search history.

(56) References Cited

U.S. PATENT DOCUMENTS

| 5,031,179 | A | * | 7/1991 | Yoshida et al. ............. 714/748 |
| 5,754,778 | A | * | 5/1998 | Shoujima .................... 709/206 |
| 5,812,278 | A | * | 9/1998 | Toyoda et al. ............. 358/402 |
| 5,872,845 | A | * | 2/1999 | Feder ......................... 358/442 |
| 5,881,233 | A | * | 3/1999 | Toyoda et al. ............. 709/233 |
| 6,094,277 | A | * | 7/2000 | Toyoda ....................... 358/1.15 |
| 6,134,582 | A | * | 10/2000 | Kennedy .................... 709/206 |
| 6,442,573 | B1 | * | 8/2002 | Schiller et al. ........... 715/500.1 |
| 6,671,061 | B1 | * | 12/2003 | Joffe et al. ................. 358/1.15 |
| 6,771,382 | B1 | * | 8/2004 | Misawa et al. ............ 358/1.15 |
| 6,778,287 | B1 | * | 8/2004 | Toyoda et al. ............. 358/1.15 |
| 6,785,017 | B1 | * | 8/2004 | Yoshiura ................... 358/1.15 |
| 2004/0008373 | A1 | * | 1/2004 | Yamamoto ................. 358/1.15 |

FOREIGN PATENT DOCUMENTS

JP 10322501 12/1998
JP 11-32196 2/1999

OTHER PUBLICATIONS

English Language Abstract of JP 11-32196.
English Language Abstract of JP 10-322501.

* cited by examiner

*Primary Examiner*—Joseph R. Pokrzywa
(74) *Attorney, Agent, or Firm*—Greenblum & Bernstein, P.L.C.

(57) ABSTRACT

A controller determines whether a transmission data amount of the image data exceeds a limit capacity of a mail server connected the electronic mail communication apparatus before an actual transmission of the image data. Further, when the transmission data amount of the image data exceeds the limit capacity of the mail server, automatic processing is performed so that an electronic mail including image data can be transmitted. Accordingly, electronic mail communication apparatus of the present invention is capable of enabling users to save a lot of time for the image transmission.

19 Claims, 9 Drawing Sheets

| DESTINATION | ADDRESS | LIMIT CAPACITY |
|---|---|---|
| AAA | aaa@***.com | 500KB |
| BBB | bbb@***.com | 250KB |
| CCC | ccc@***.com | 500KB |
| ⋮ | ⋮ | ⋮ |

| MAIL SERVER | LIMIT CAPACITY | IP ADDRESS |
|---|---|---|
| 1 | 500KB | △△△.×××.000.1 |
| 2 | 250KB | △△△.×××.000.2 |
| 3 | 700KB | △△△.×××.000.3 |
| ⋮ | ⋮ | ⋮ |

ELECTRONIC MAIL COMMUNICATION APPARATUS AND COMMUNICATION METHOD

BACKGROUND OF THE INVENTION

1. Field of the Invention

This invention relates to an electronic mail communication apparatus and an electronic mail communication method that convert scanned image data into an attachment file, attach the attachment file to an electronic mail and send out the electronic mail with the attachment file.

2. Description of Related Art

Conventionally, there is a so-called internet facsimile apparatus, which is a facsimile apparatus having a function as an electronic mail communication apparatus that attaches image data scanned from an original by a scanning device to an electronic mail and sends out the electronic mail with the image data to a PC through an internet. Such an internet facsimile apparatus can also send an electronic mail to another internet facsimile apparatus through an internet.

The internet facsimile apparatus is configured to send an electronic mail via a mail server, when an electronic mail is sent through the internet. However, when the internet facsimile apparatus tries to send image data having a large data amount, and the transmission data amount of the electronic mail also becomes large. Thus, the mail server has a big burden. Accordingly, the mail server has a limit of a transmission data amount of an electronic mail that can be transmitted. When the internet facsimile apparatus sends an electronic mail exceeding the limit (limit capacity) to the mail server, the mail server returns a signal indicating that the electronic mail cannot be transmitted to an internet facsimile apparatus and stops the transmission of the electronic mail.

However, the conventional internet facsimile apparatus does not know the capacity of the mail server. Accordingly, in the conventional internet facsimile apparatus, whether a transmission data amount of an electronic mail exceeds the limit capacity of the mail server cannot be predicted until the electronic mail is sent to the mail server. Thus, in the conventional internet facsimile apparatus, after the user once sends out an electronic mail including image data, the user may repeatedly send out the electronic mail after reducing the image data so that the transmission data amount of the electronic mail becomes lower than the limit capacity of the mail server.

This invention is provided in view of the above-described problems. The object of the present invention is to provide an electronic mail communication apparatus and an electronic mail communication method that can determine whether the transmission data amount of an electronic mail including image data is larger than a limit capacity of the mail server, before the electronic mail including the image data is transmitted to the mail server.

SUMMARY OF THE INVENTION

An object of the present invention is to provide an electronic mail communication apparatus and an electronic mail communication method, which are capable of enabling users to save a lot of time for the image transmission.

In the present invention, a controller determines whether a transmission data amount of the image data exceeds a limit capacity of a mail server connected the electronic mail communication apparatus before an actual transmission of the image data. Further, when the transmission data amount of the image data exceeds the limit capacity of the mail server, automatic processing is performed so that an electronic mail including image data can be transmitted.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

First Embodiment

An electronic mail communication apparatus according to a first embodiment of the present invention that is applied to an internet facsimile apparatus is explained in the following. First, a communication system including the internet facsimile apparatus of the first embodiment is explained with reference to FIG. 1.

Figure 1:
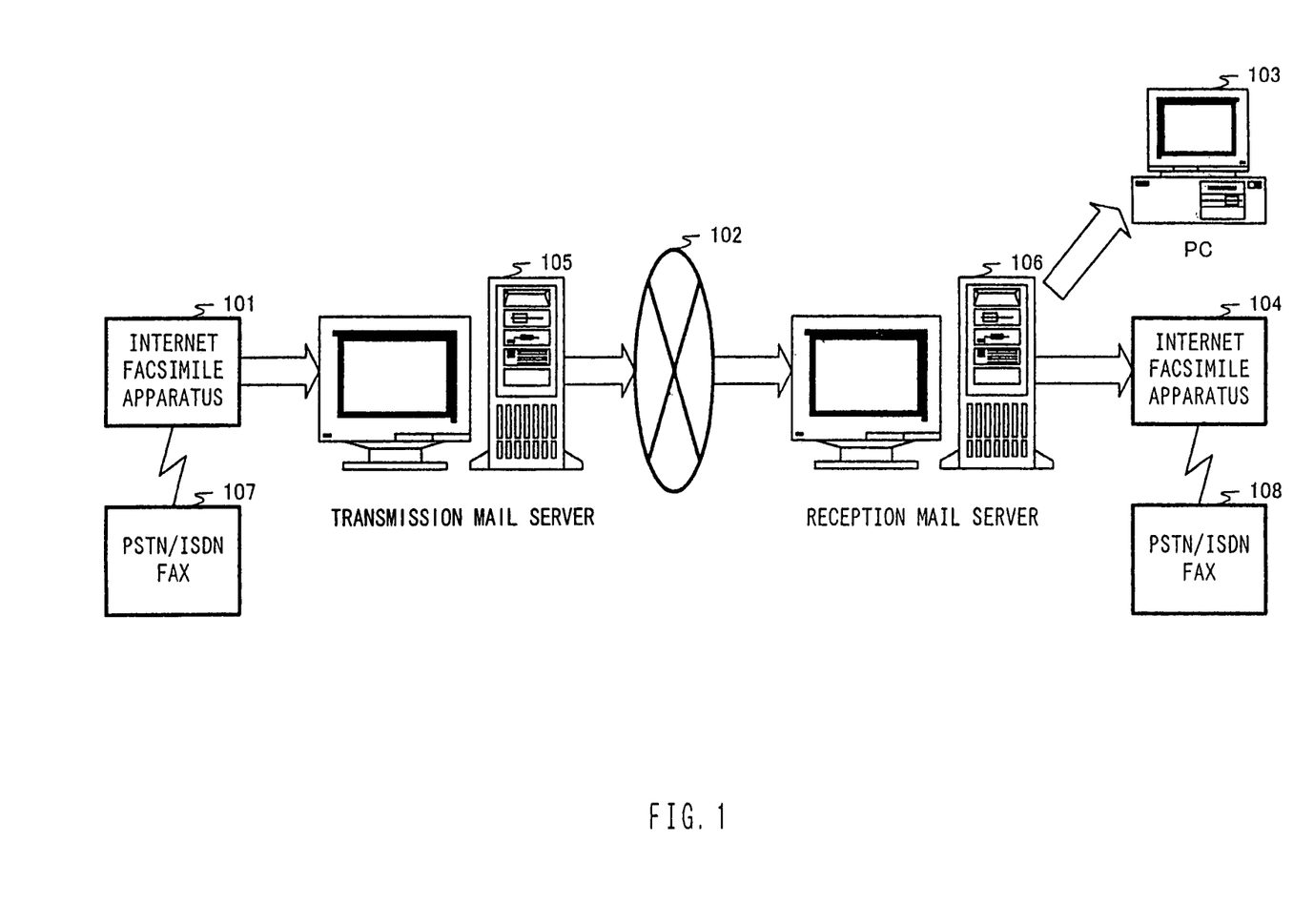
FIG. 1 is a block diagram illustrating a communication system including an internet facsimile apparatus according to the first embodiment of the present invention.

The following explains a condition when an internet facsimile apparatus 101 of the present invention (referred as IFAX 101 in the following) transmits image data of an original to a PC 103 or another internet facsimile apparatus 104 (referred as IFAX 104 in the following) through an internet 102. First, the IFAX 101 scans image data from an original using a scanning device. Next, the IFAX 101 converts the scanned image data into a format that is attachable to an electronic mail and then attaches the converted image data to the e-mail. Then, the IFAX 101 transmits the electronic mail, including an attachment file, and an e-mail address indicating a destination of the e-mail to the mail server 105 at a transmission side (referred as transmission mail server 105 in the following).

The IFAX 101 stores an IP address of the transmission mail server 105. Thus, when the IFAX 101 transmits an electronic mail and an e-mail address, the electronic mail and the e-mail address are automatically directed to the transmission mail server 105. When plural transmission mail servers are provided, any one transmission mail server can be selected from the plural transmission mail servers by changing a setting of an IP address of the transmission mail server stored in the IFAX 101.

The transmission mail server 105 analyzes (parses) the e-mail address transmitted from the IFAX 101 and determines an IP address of a reception side mail server 106 (referred as reception mail server 106) to which the electronic mail should be transmitted. Then, the transmission mail server 105 transmits the electronic-mail to the reception mail server 106 through the internet 102.

The reception mail server 106 transmits the electronic mail to a PC 103 or an IFAX 104 having the transmitted e-mail address in response to the electronic mail transmission request coming from the PC 103 or IFAX 104. When the IFAX 101 sends an electronic mail to the PC 103 or to the IFAX 104, image data is thus transmitted to the PC 103 or IFAX 104.

The IFAX 101 or IFAX 104 functions as a relay station in communication between a common FAX 107 or 108, which merely has a facsimile communication function of an image via PSTN or ISTN, and the PC 103. The following describes an operation performed by the IFAX 101 used as a relay station, when an electronic mail is transmitted from the FAX 107 to the PC 103.

The IFAX 101 converts a facsimile image transmitted from the FAX 107 into a file that can be attached to an electronic mail and sends the converted file attached to the electronic-mail to the transmission mail server 105. The transmission mail server 105 transmits the electronic mail to the PC 103 via the reception mail server 106. When the FAX 107 transmits an image to the PC 103, a fax number of the IFAX 101 as a relay station and an electronic mail address of the PC 103 are input into the FAX 107.

Each of the transmission mail server 105 and the reception mail server 106 has a limit capacity of an amount of an electronic mail that can accept in a single reception of an electronic mail. When the transmission mail server 105 receives an electronic mail exceeding the limit capacity from the IFAX 101, the transmission mail server 105 returns a signal indicating that the transmission data amount of the electronic mail exceeds the limit capacity and therefore the electronic mail cannot be transmitted. When the transmission data amount of an electronic mail transmitted from the IFAX 101 exceeds the limit capacity of the reception mail server 106, the reception mail server 106 returns to a signal indicating that the transmission data amount of the electronic mail exceeds the limit capacity and thus the electronic mail cannot be transmitted to the IFAX 101.

As described above, the IFAX 101 cannot send an electronic mail having a transmission data amount exceeding the limit capacity of the transmission mail server 105 or the limit capacity of the reception mail server 106 to the PC 103 or the IFAX 104. Accordingly, before an electronic mail to which image data is attached is sent out, the IFAX 101 of the present invention determines whether the transmission data amount of the electronic mail to be transmitted exceeds the limit capacity of the transmission mail server 105 or the limit capacity of the reception mail server 106. When the transmission data amount of the electronic mail exceeds the limit capacity of either of the transmission mail server 105 or the reception mail server 106, the IFAX 101 processes the electronic mail so that the transmission data amount of the electronic mail does not exceed the limit capacity.

Figure 2:
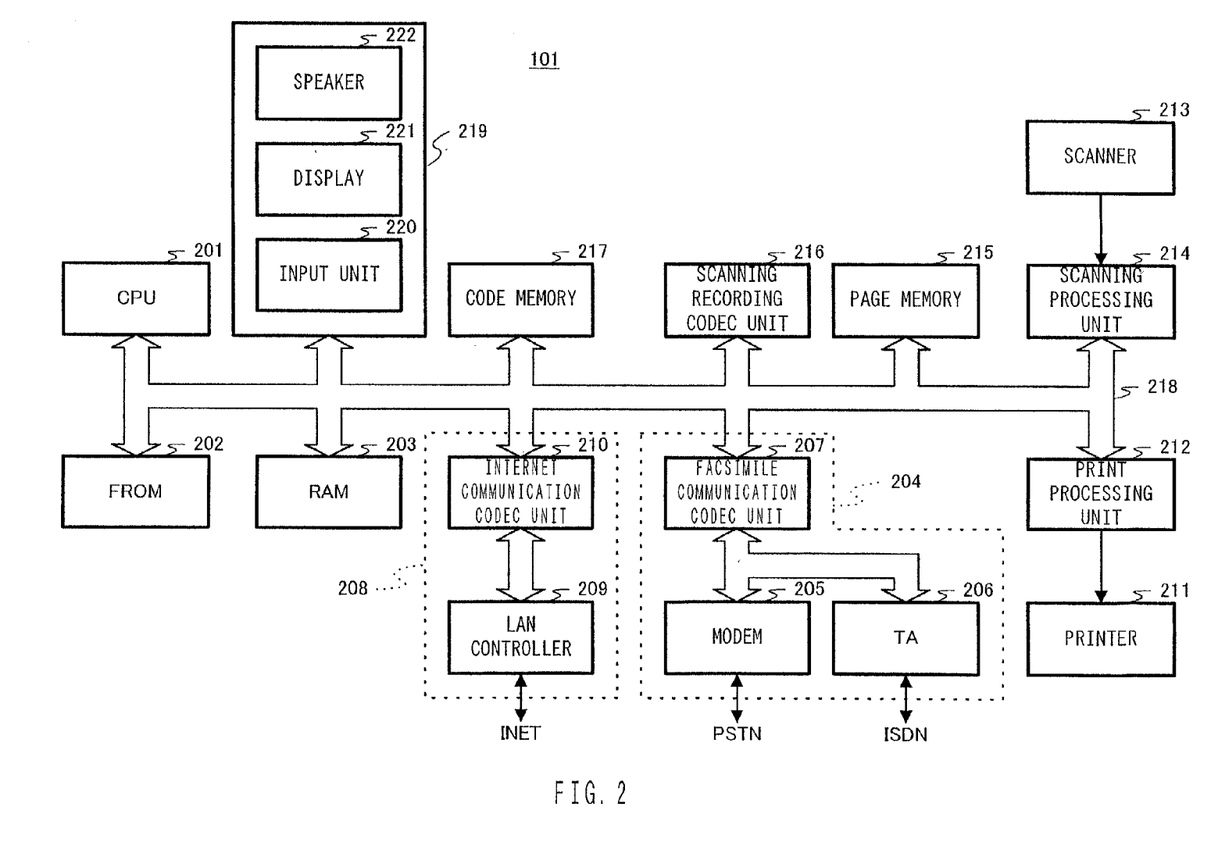
FIG. 2 is a block diagram illustrating hardware of the internet facsimile apparatus according to the first embodiment of the present invention.

In the following, a configuration of the IFAX according to the first embodiment of the present invention is described with reference to FIG. 2. FIG. 2 is a block diagram illustrating hardware of the internet facsimile apparatus according to the first embodiment of the present invention.

A CPU 201 performs programs stored in a memory device and controls the entire IFAX 101.

As to the memory device, a flash memory 202 (referred as an FROM 202 in the following) and RAM 203 (random access memory) are provided. The FROM 202 stores programs executed by the CPU 201. The FROM 202 further stores a received electronic mail, an electronic mail to be sent out, a destination e-mail address, a password used for a variety of communication, a limit capacity of the transmission mail server 105 or the reception mail server 106, and so on.

Figure 3:
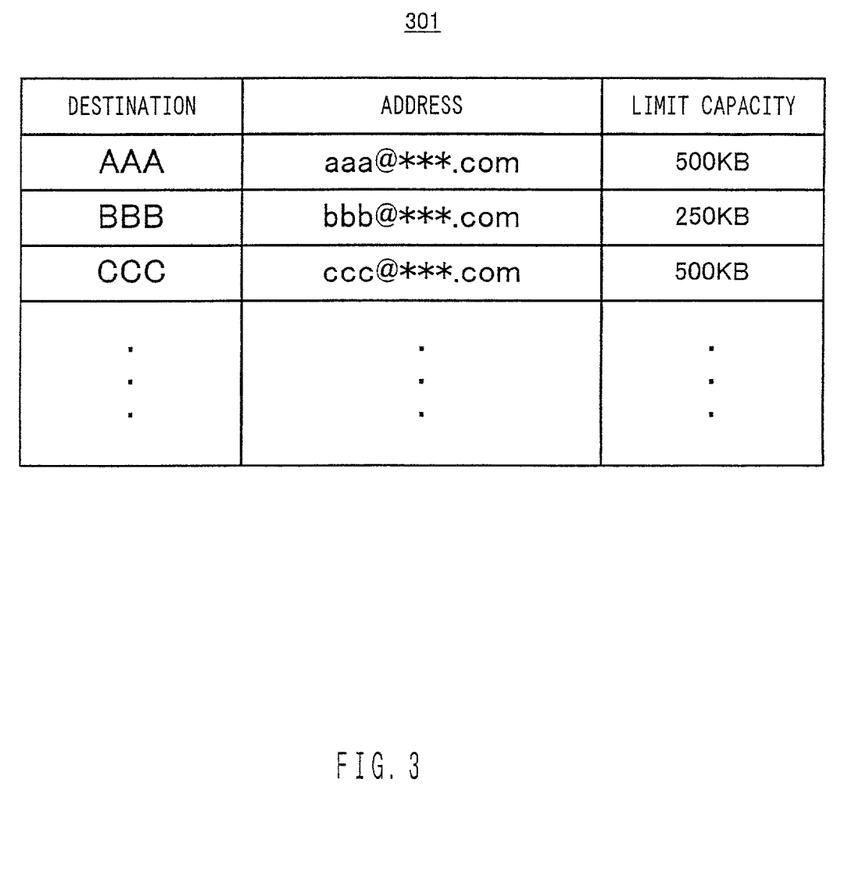
FIG. 3 shows a limit capacity to the according to the first embodiment of the present invention.

FIG. 3 shows a limit capacity table 301 stored in the FROM 202. The limit capacity table 301 includes plural destinations, plural electronic mail addresses for the plural destinations, and limit capacities of a transmission data amount of a single electronic mail that can be transmitted to the plural destinations in association with one another. The limit capacity stored in the limit capacity table 301 is a smaller value between the limit capacity of the transmission mail server 105 and the limit capacity of the reception mail server 106, which are used when an electronic mail is transmitted to a destination. The contents stored in the limit capacity table 301 can be arbitrarily rewritten or added by a user. Further, the IFAX 101 can automatically register a new e-mail address entered by a user at the time of transmission of an electronic mail as the e-mail address stored in the limit capacity table 301. The limit capacity stored in the limit capacity table 301 can continuously be upgraded by the limit capacity that is learned (or obtained) when image data is transmitted to an input e-mail address. In other words, when image data cannot be transmitted, the transmission data amount of the image data that cannot be transmitted is stored as the limit capacity of a server in the limit capacity table 301.

Figure 4:
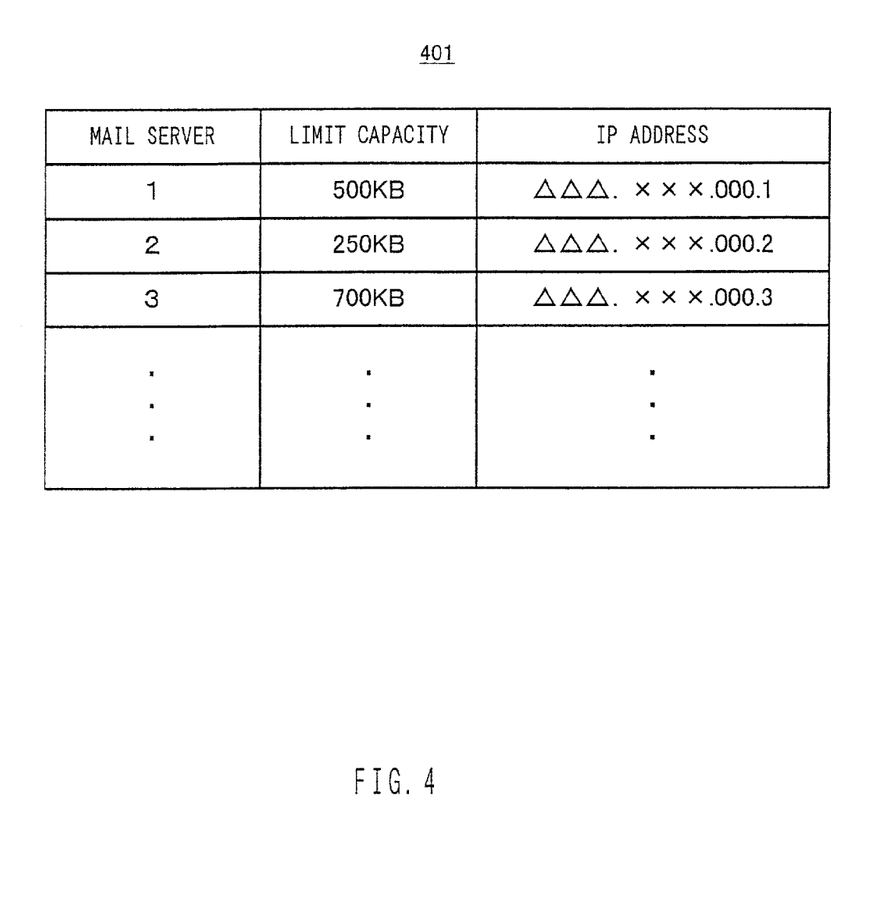
FIG. 4 shows a mail server table according to the first embodiment of the present invention.

A FROM 202 further stores a mail server table 401 as shown in FIG. 4. The mail server table 401 includes transmission mail servers that can be used by the IFAX 101, limit capacities of the transmission mail servers and IP addresses of the transmission mail servers in association with one another. The user can arbitrarily rewrite or add the contents stored in the mail server table 401.

The RAM 203 is a work memory into which the programs stored in the FROM 202 is downloaded and that temporarily stores a variety of data such as an electronic mail and an image file.

The IFAX 101 further includes a facsimile communication controller 204 that controls a transmission and reception of a signal through the PSTN or the ISDN. The facsimile communication controller 204 includes a modem 205 and a terminal adapter 206. The modem 205 is used for data communication and facsimile communication via PSTN. The terminal adapter 206 is used for data communication and facsimile communication via ISDN. The facsimile communication controller 204 further includes a facsimile communication codec unit 207 that, upon transmission, converts image data into a format corresponding to the coding method of the device of the destination and that changes resolution of the image data to be transmitted. Further, the facsimile communication codec unit 207 decodes received image data so as to fit to IFAX 101.

The IFAX 101 further includes an internet communication controller 208, which is a mail transmission and reception unit that controls transmission and reception of signals with the transmission mail server 105. The internet communication controller 208 includes a LAN controller 209 that performs data communication and facsimile communication via a LAN. Further, the internet communication controller 208 includes an internet communication codec unit 210 that, upon transmission, encodes image data into a format corresponding to a coding method of the device of the destination, that converts the image data into a file that can be attached to an electronic mail, and that changes resolution of the image data to be transmitted. The internet communication codec unit 210 further decodes a received attachment file so as to fit to IFAX 101.

The IFAX 101 further includes a printer 211 that prints an image transmitted from the other communication apparatus. An image transmitted from the other communication apparatus passes through the facsimile communication controller 204 or the internet communication controller 208 and is sent to a print processing unit 212 via a bus 218. The print processing unit 212 controls the received image and sends it to the printer 211. The print processing unit 212 is operated in accordance with an instruction from the CPU 201.

The IFAX 101 further includes a scanner 213 that scans an original to obtain image data to be transmitted to the other communication apparatus. The scanner 213 scans image data as binary data. The scanner 213 sends the image data to a scanning processing unit 214 in order of scanning.

The scanning processing unit 214 sends the image data received from the scanner 213 sequentially to a page memory 215. The scanning processing unit 214 controls the scanner 213 in accordance with an instruction from CPU 201.

The page memory 215 stores a page of the image data received from the scanning processing unit 214. When a complete page of the image data is stored, the page memory 215 sends the image data to a scanning recording codec unit 216 line by line.

The scanning recording codec unit 216 encodes the received image data and sends the encoded image data to a code memory 217. The code memory 217 stores entire image data of all originals to be transmitted. When the storing of the image data has been completed, the code memory 217 sends the encoded image data to either of the facsimile communication codec unit 207 or internet communication codec unit 210. In addition, by referring to an address of the used memory area in the code memory 217, a transmission data amount for the stored image data can be obtained.

Since the image data sent from the code memory 217 is encoded as a code fitting to the IFAX 101, the facsimile communication codec unit 207 or the internet communication codec unit 210 further encodes the received image data into a format corresponding to the coding method of a communication apparatus of a destination. Then, the further encoded image data is transmitted to the communication apparatus of the destination through either of the modem 205, TA 206 or a LAN controller 209.

The IFAX 101 farther includes a panel unit 219. The panel unit includes an input unit 220 for receiving a variety of input, a display that displays a variety of statuses of processing, and a speaker 222 that generates an error sound (alarm) to inform a trouble of IFAX 101. Since either a display 221 or the speaker 222 informs the user of a current operational status of the IFAX 101, the user can recognize the current operational status of the IFAX 101.

The IFAX 101 of the present invention can determine whether the image data to be transmitted can be transmitted via the internet transmission mail server 105 and the reception mail server 106 before the image data is sent out. When the image data is transmitted via the transmission mail server 105 and the reception mail server 106, the image data is always transmitted via internet. In the following, an image data transmission operation of the IFAX 101 according to the first embodiment is described with reference to FIG. 5.

Figure 5:
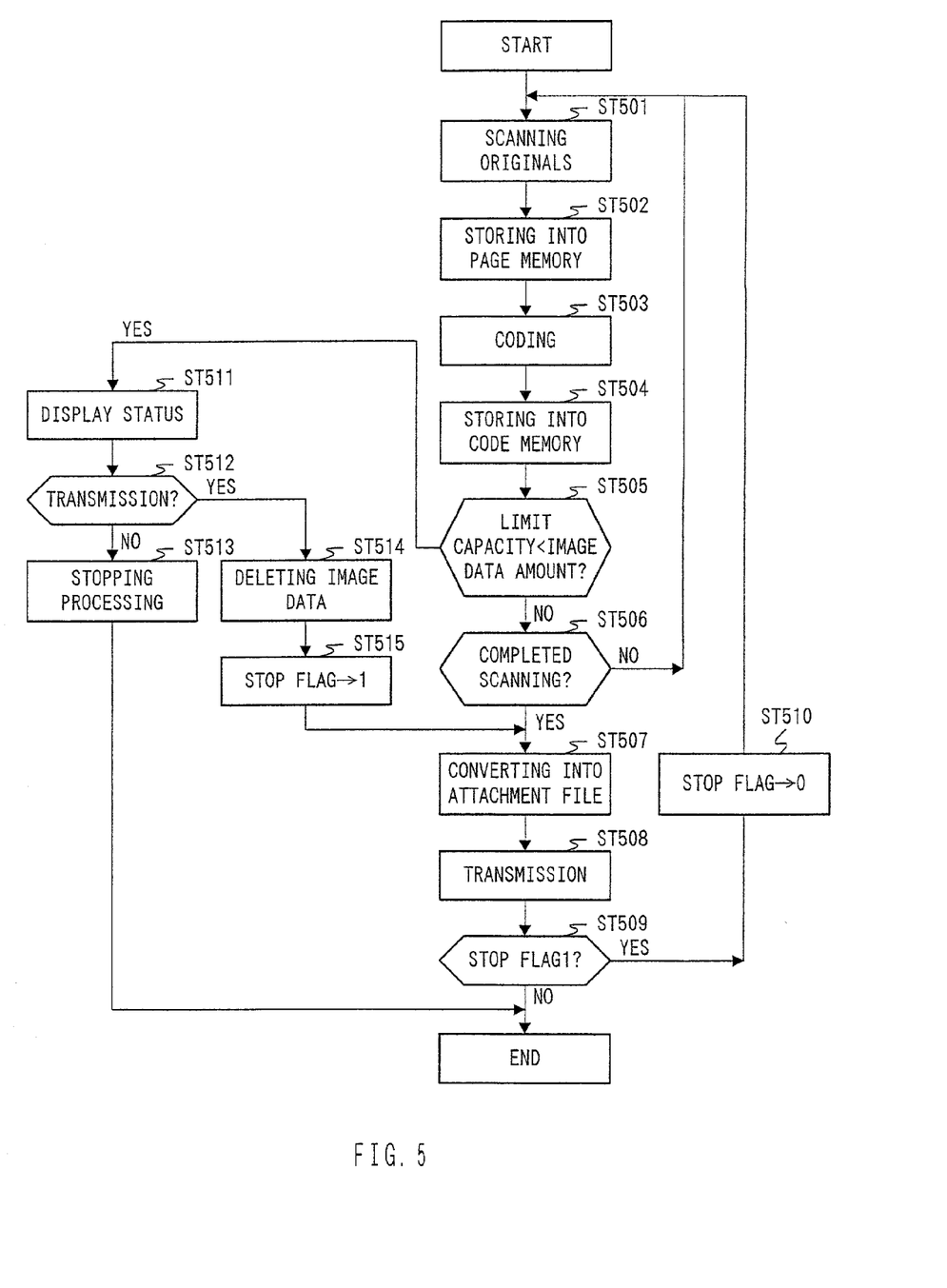
FIG. 5 is a flowchart illustrating image data transmission operation performed by the internet facsimile apparatus according to the first embodiment of the present invention.

First, the user sets an original on the scanner 213. Then, the user operates the input unit 220 to input an e-mail address of the destination and inputs an instruction to start transmission. Then, IFAX 101 starts the transmission operation of an electronic mail.

When the transmission operation of an electronic mail starts, the IFAX 101 controls the scanning processing unit 214 to start an original scanning operation of the scanner 213 (ST 501). In ST 501, originals are scanned page by page. Image data of the original scanned by the scanner 213 is sent to the page memory 215 via the scanning processing unit 214 to be stored in the page memory 215 (ST 502). When the page memory 215 stores a page of image data, the page memory 215 sends the image data line by line to the scanning recording codec unit 216. The scanning recording codec unit 216 encodes the received image data into a coding format of the IFAX 101 (ST 503), and then sends the encoded image data to the code memory 217. The code memory 217 stores the received image data (ST 504).

Next, the IFAX 101 starts to processing that determines whether the scanned image data has a transmission data amount that can be transmitted through the transmission mail server 105. In this processing, IFAX 101 refers to FROM 202 and the code memory 217, and determines whether the transmission data amount of the scanned image data is larger than the limit capacity of the transmission mail server 105 and the limit capacity of the reception mail server 106 (in the following, simply called a server limit capacity). (ST 505).

In the ST 505, if the IFAX 101 determines that the transmission data amount of the scanned image data does not exceed the server limit capacity, the IFAX 101 refers to the status of the scanner 213, and determines whether the scanning of all originals has been completed or not (ST 506). Then, the IFAX 101 repeats the processing from the ST 501 to ST 505 until the scanning of all originals has been completed.

If it is determined in ST 506, that the processing from ST 501 to ST 505 has been completed for all originals, the IFAX 101 proceeds to an operation of transmission of the image data through the Internet 102. First, the IFAX 101 sends the image data stored in the code memory 217 to the internet communication codec unit 210. Then, the internet communication codec unit 210 converts the received image data into a format (attachment file) that can be attached to an electronic mail (ST 507). Then, the internet communication codec unit 210 attaches the attachment file to an electronic mail, and transmits the electronic mail through the LAN controller 209 (ST 508).

Next, the IFAX 101 determines whether a stop flag is one (1) or not (ST 509). The stop flag set to one indicates that scanning operation of originals is interrupted in the middle due to some reasons and that scanning and transmission of the rest of the originals are required later. In ST 509, when the stop flag is 1, the stop flag is reset to 0 (ST 510), then the control returns to the processing of ST 501 and repeats the processing starting from ST 501. On the other hand, if, in step ST 509, the stop flag is 0, the image data transmission processing (operation) is terminated.

On the other hand, in ST 505, when IFAX 101 determines that the transmission data amount of the scanned image data exceeds the server limit capacity, the display 221 of the panel unit 219 displays the status and the speaker 222 generates an error sound to inform the user (ST 511). Accordingly, the user can recognize that the transmission data amount of the image data is too large and can perform desired processing.

Then, the IFAX 101 displays an instruction on the display 221 of the panel unit 219 to decide whether the image data having been scanned from the original till now will be transmitted or the image data transmission operation should be stopped. Then, the IFAX 101 determines, based on the input data from the input unit 220, whether the image data having been scanned from the original till now should be transmitted or the image transmission operation should be terminated (ST 512).

In step ST 512, when a signal indicating stop of image data transmission operation is input, the IFAX 101 performs stop processing, which stops the image data transmission operation (ST 513). Here, the stop processing means processing that initializes the processing units relating to the image data transmission of IFAX 101, by, for example, clearing data stored in code memory 217. Then, IFAX 101 terminates the image transmission processing after the processing operation of ST 513.

On the other hand, in ST 512, when a signal indicating transmission of the image data is input, the IFAX 101 performs processing that transmits the image data within the limit capacity of the transmission mail server 105. In detail, the IFAX 101 deletes a page of image data from the image data stored in the code memory 217 and sends the image data in the code memory 217 to the internet communication codec unit 210 (ST 514). Then, in order to store history indicating that the rest of the originals should be transmitted later, the stop flag is set to 1 (ST 515). Then, the IFAX 101 performs the processing from ST 507 to ST 509. At this time, since the stop flag is set to 1 in ST 509, the IFAX 101 proceeds to the processing of ST 501 to send the image data of the rest of the originals.

As described above, the IFAX 101 can determine whether the image data of the originals to be transmitted exceeds the server limit capacity, before the transmission of the image data of the originals. Further, the IFAX 101 can inform the user of the result of determination. Further, the IFAX 101 can change processing in accordance with the result of the determination.

The IFAX 101 can automatically change the setting of the server limit capacity in accordance with the e-mail address of the destination. In the following, the processing in which the IFAX 101 changes the server limit capacity is explained with reference to a flowchart shown in FIG. 6.

Figure 6:
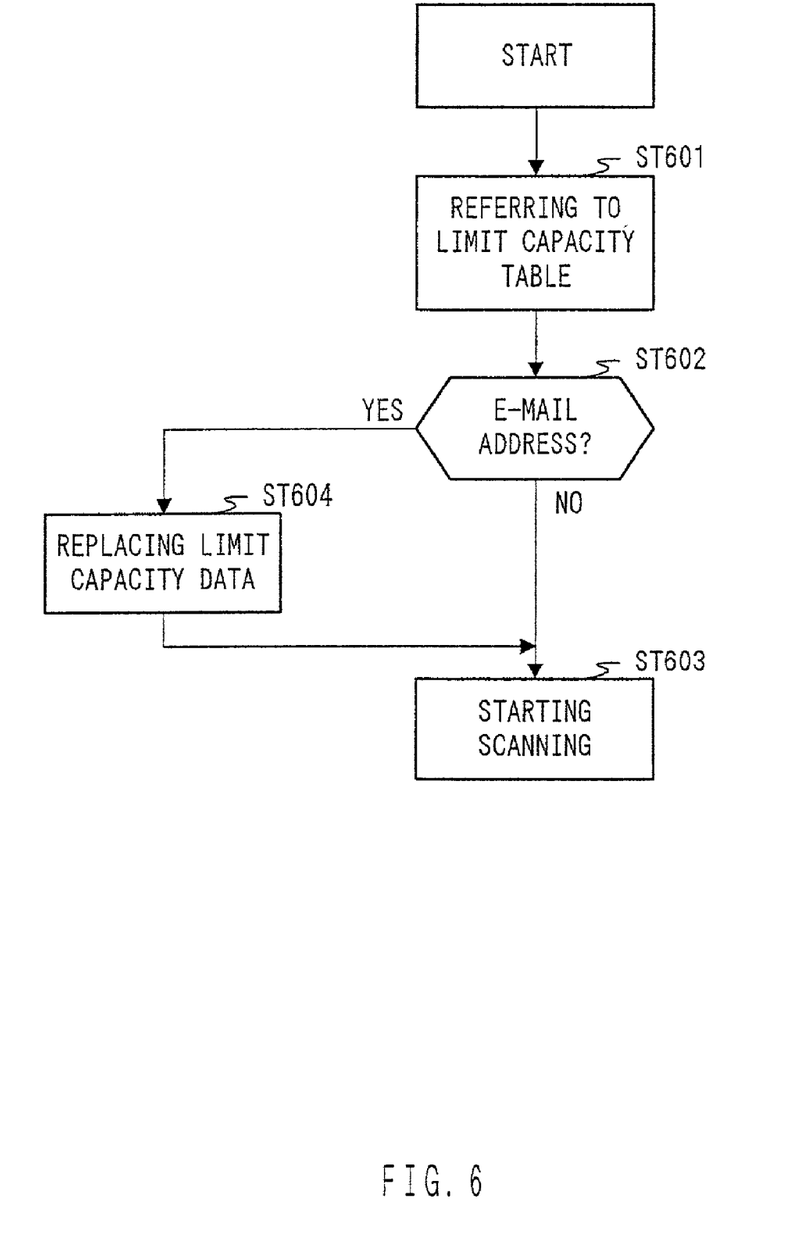
FIG. 6 is a flowchart illustrating a process that changes the limit capacity of the mail server performed by the internet facsimile apparatus according to the first embodiment of the present invention.

When the user operates the input unit 220 to input an e-mail address of a destination, the IFAX 101 refers to the limit capacity table 301 (ST 601), and determines whether data of a server limit capacity corresponding to the input e-mail address is stored in the limit capacity table 301 (ST 602). In ST 602, when the data corresponding to the input e-mail address is not stored in the limit capacity table 301, the IFAX 101 uses a predetermined limit capacity, which is input in advance, and starts the scanning operation of the image data (ST 603).

On the other hand, in ST 602, when the data of the server limit capacity corresponding to the input e-mail address is stored in the limit capacity table 301, the IFAX 101 reads the server limit capacity corresponding to the input e-mail address from the limit capacity table 301, and replaces the preset server limit capacity by the read limit capacity (ST 604). Then, the control proceeds to the process of ST 603.

As described above, the IFAX 101 can set an optimum server limit capacity in accordance with the e-mail address of the destination. Accordingly, image data can be transmitted effectively.

As described above, according to the first embodiment, the IFAX 101 can determine whether the transmission data amount of the image data of the original to be transmitted exceeds the server limit capacity. Accordingly, whether the image data can be transmitted or not is determined before the image data is actually sent out. Thus, the user does not need to send the same original repeatedly.

Further, according to the first embodiment, automatic processing can be performed in which image data having a transmission data amount which can be transmitted at once is transmitted first and the rest of the image data is transmitted later according to the result of the determination to decide whether the image data can be transmitted or not. Accordingly, the user can save a lot of time for the image transmission.

In the first embodiment, the server limit capacity is set to the smaller value of the transmission mail server 105 and the reception mail server 106. However, it is possible to use the limit capacity either of the transmission mail server 105 or the reception mail server 106.

The Second Embodiment

In an IFAX according to the second embodiment of the present invention, when the transmission data amount of the image data to be transmitted exceeds the server limit capacity, resolution of the image data is changed to reduce the transmission data amount of the image data so that the image data can be transmitted at once.

Figure 7:
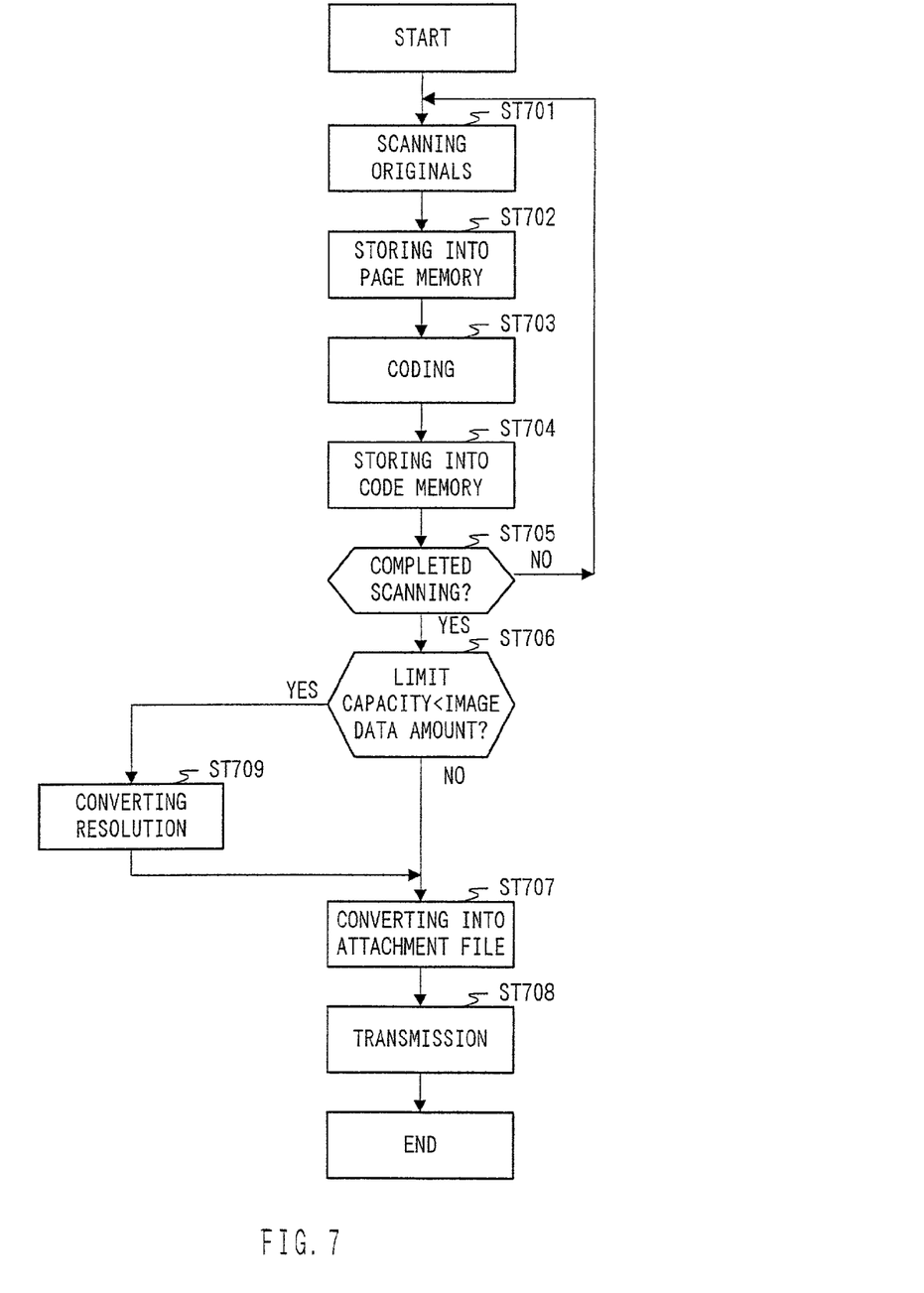
FIG. 7 is a flowchart illustrating an image data transmitting operation performed by the internet facsimile apparatus according to the second embodiment of the present invention.

In the following, an image transmission operation of the IFAX according to the second embodiment is described with reference to FIG. 7. Since the configuration of the IFAX according to the second embodiment is the same as the configuration of the IFAX according to the first embodiment, the description of the configuration of the IFAX according to the second embodiment is omitted here and the image transmission operation is described by using the reference numerals used in the first embodiment.

First, IFAX 101 scans image data to be transmitted in the processing from ST 701 to ST 704. Since the processing from ST 701 to ST 704 is the same as the processing from ST 501 to ST 504, which is explained with reference to FIG. 5, the description is omitted here. Next, the IFAX 101 determines whether the scanning of image data from all originals is completed (ST 705), and repeats the processing from ST 701 to ST 705 until the scanning of all the originals is completed.

Then, in ST 705, when it is determined that the scanning of all the originals is completed, the IFAX 101 refers to the code memory 217, and detects the transmission data amount of the scanned image data. Then, the IFAX 101 determines whether the detected transmission data amount of the image data scanned from the originals exceeds the server limit capacity (ST 706).

In ST 706, when it is determined that the transmission data amount of the image data scanned from the originals does not exceed the server limit capacity, the processing of ST 707 and ST 708 is performed and the image transmission processing (operation) is terminated. The processing of ST 707 and ST 708 is the same as the processing of ST 507 and ST 508 explained with reference to FIG. 5, the detailed description is omitted here.

On the other hand, in ST 706, when it is determined that the transmission data amount of the image data scanned from the originals exceeds the server limit capacity, the resolution of the scanned image is converted in order to reduce the transmission data amount of the scanned image data (ST 709). The method of resolution conversion performed in ST 709 is selected according to how much the transmission data amount of the scanned image data exceeds the server limit capacity. In other words, the more the transmission data amount or the scanned image data is, the more the transmission data amount of the image is reduced so that the image data becomes coarser after the resolution conversion. Then, the IFAX 101 performs the resolution conversion to reduce the transmission data amount of the scanned image data to the amount within the server limit capacity. Then, the IFAX 101 performs the processing starting from ST 707, and then terminates the process.

As described above, according to the second embodiment, when the transmission data amount of the image data scanned from the originals exceeds the server limit capacity, the resolution conversion of the scanned image is automatically performed, and thus, the transmission data amount of the image data can be reduced. Accordingly, the image data scanned from the originals can be converted into a condition in which the image data can be transmitted at once, without intervention by the user's operation.

The Third Embodiment

In an IFAX according to the third embodiment of the present invention, when the transmission data amount of the image data to be transmitted exceeds the server limit capacity, the image data is divided by using dividing software and each divided image data is transmitted one by one so that the transmission data amount of the image data for a single transmission is reduced.

In the following, an image transmission operation of the IFAX according to the third embodiment is described with reference to FIG. 8. The configuration of the IFAX according to the third embodiment is the same as the configuration of the IFAX according to the first embodiment or the second embodiment, the description of the configuration of the IFAX according to the third embodiment is omitted here and the operation is explained by using the same reference numerals as those used in the first embodiment.

First, the IFAX 101 performs the processing from ST 801 to ST 805 to scan all image data to be transmitted. The processing from ST 801 to ST 805 is the same as the processing from ST 701 to ST 705 described with reference to FIG. 7, the detailed description is omitted here.

Then, in ST 805, if it is determined that the scanning of all originals has been completed, the IFAX 101 refers to the code memory 217 and detects the transmission data amount of the image data scanned from the originals. Then, the IFAX 101 determines whether the detected transmission data amount of the image data scanned from the originals exceeds the server limit capacity (ST 806).

In ST 806, if it is determined that the transmission data amount of the image data scanned from the originals does not exceed the server limit capacity, the processing of ST 807 and ST 808 is performed and the image transmission processing (operation) is terminated. Since the processing of ST 807 and ST 808 is the same as the processing from ST 507 and ST 508 described with reference to FIG. 5, the detailed description is omitted here.

On the other hand, it is determined in ST 806 that the transmission data amount of the image data scanned from the originals exceeds the server limit capacity, the IFAX 101 uses dividing software to divide the image data to be transmitted (ST 809). The dividing software is commonly circulated as software that divides a file. Then, the IFAX 101 creates a batch file to reconstruct the image data divided in ST 809 (ST 810).

Next, the IFAX 101 converts one of the divided image data into a format that can be attached to an electronic mail (ST 811). Then, the IFAX 101 creates an electronic mail to which the one of the divided image data after conversion is attached, and transmits the created electronic mail (ST 812). Next, the IFAX 101 determines whether all of the divided image data is attached to an electronic mail (ST 813), and repeats the processing from ST 811 to ST 813 until all of the divided image data is transmitted.

Then, in ST 813, if it is determined that all of the divided image data is transmitted, the file reconstruction batch file created in ST 810 is transmitted so that the divided image data can be reconstructed at the device of the destination (ST 814). Then, the operation is terminated.

As described above, according to the third embodiment, when the transmission data amount of the image data scanned from originals exceeds the server limit capacity, the scanned image data is automatically divided and each of the divided image data is transmitted at once, the transmission data amount of the image data transmitted in a single transmission can be reduced. Further, since the transmission data amount of the image data can be substantially reduced by using software, the image data having a large transmission data amount can be transmitted without exceeding the server limit capacity. Further, since the file division explained in the third embodiment is performed without an intervention by the user's operation, the user does not need an extra time. Further, according to the third embodiment, a batch file for file reconstruction can be transmitted with an electronic mail, the divided file can be reconstructed at the device of the destination.

The Fourth Embodiment

In an IFAX according to the fourth embodiment of the present invention, when the transmission data amount of the originals to be transmitted exceeds the server limit capacity, the server limit capacity is changed by changing the transmission mail server where an electronic mail goes through.

Figure 9:
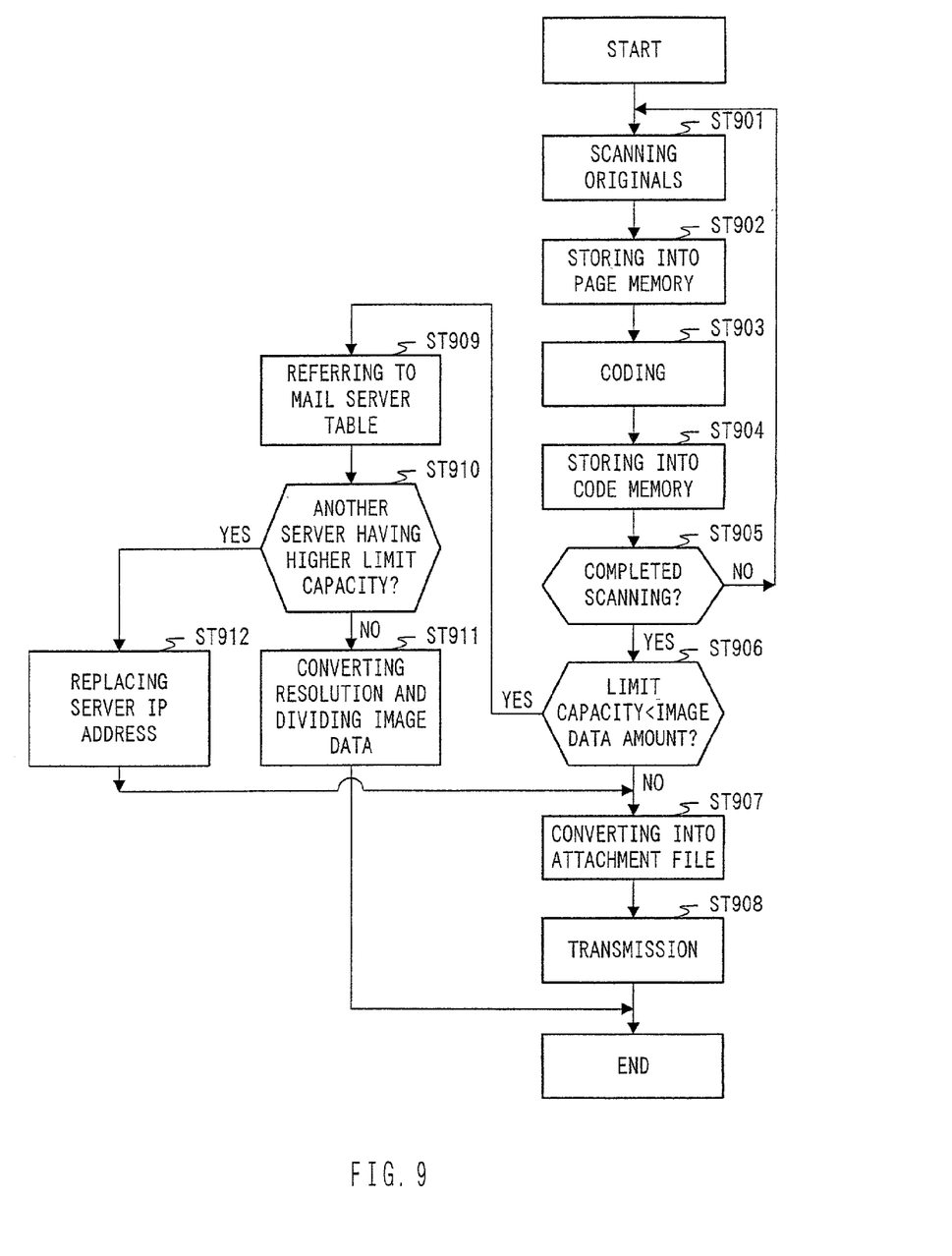
FIG. 9 is a flowchart illustrating an image data transmitting operation performed by the internet facsimile apparatus according to the fourth embodiment of the present invention.

In the following, an image transmission operation of the IFAX according to the fourth embodiment is described with reference to FIG. 9. Since the configuration of the IFAX according to the fourth embodiment is the same as the configurations of the first through the third embodiments, the configuration of the IFAX according to the fourth embodiment is omitted here and the image transmission operation is explained by using the same reference numerals used in the first embodiment.

First, the IFAX 101 performs the processing from ST 901 to ST 905 to scan image data to be transmitted. The processing from ST 901 to ST 905 is the same as the processing from ST 701 to ST 705 explained with reference to FIG. 7, the detailed description is omitted here.

Then, when it is determined in ST 905 that the scanning of all the originals is completed, the IFAX 101 refers to the code memory 217 and detects the transmission data amount of the image data scanned from the originals. Then, the IFAX 101 determines whether the detected transmission data amount of the image data scanned from the originals exceeds the server limit capacity (ST 906).

In ST 906, if the transmission data amount of the image data scanned from originals does not exceed the server limit capacity, the processing of ST 907 and ST 908 is performed and then the image transmission process is terminated. The processing of ST 907 and ST 908 is the same as the processing of ST 507 and ST 508 explained in FIG. 5, the detailed explanation is omitted here.

On the other hand, when it is determined in ST 906 that the transmission data amount of the image data scanned from the originals exceeds the server limit capacity, the IFAX 101 refers to the mail server table 401 (ST 909) to find whether there is another connectable transmission mail server having a higher server limit capacity (ST 910).

Figure 8:
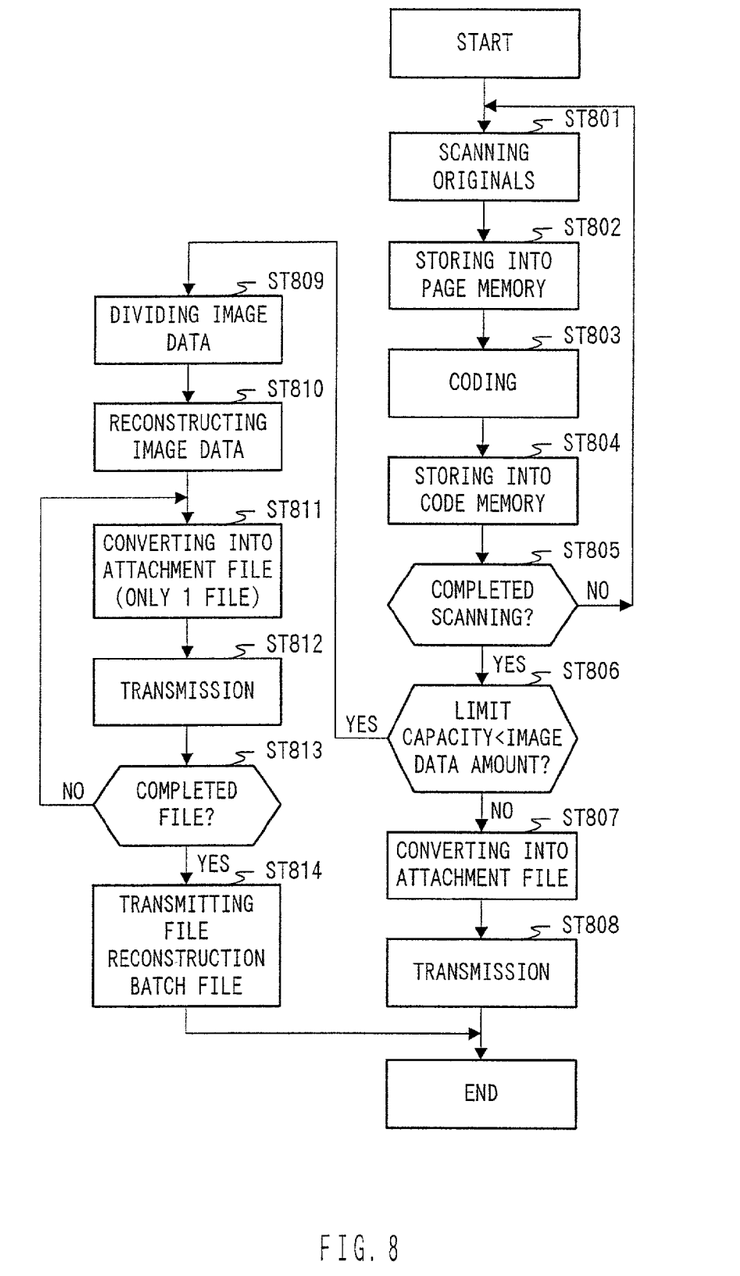
FIG. 8 is a flowchart illustrating an image data transmitting operation performed by the internet facsimile apparatus according to the third embodiment of the present invention.

In ST 910, if it is determined that there is no connectable transmission mail server having a higher limit capacity, the IFAX 101 performs the processing of ST 707 and ST 708 after the ST 709 as described with reference to FIG. 7, or the processing from ST 809 to ST 814 described with reference to FIG. 8 is performed (ST 911). Then, the image data transmission processing (operation) is terminated.

On the other hand, in ST 910, if it is determined that there is a connectable transmission mail server having a higher limit capacity, the IFAX 101 further refers to the mail server table 401 and detects an IP address of the transmission mail server having the higher limit capacity. Then, the IFAX 101 replaces the preset IP address of the transmission mail server by the detected IP address (ST 912). Then, the IFAX 101 performs the processing of ST 907 and ST 908 and terminates the image transmission processing (operation).

As described above, according to the fourth embodiment of the present invention, when the transmission data amount of the image data scanned from originals exceeds the server limit capacity, the IFAX 101 refers to the mail server table 401 and the transmission mail server to pass by is automatically replaced by the one having the higher server limit capacity. Accordingly, the image data having a large transmission data amount can be transmitted without intervention by a user operation.

As described above, according to the first through fourth embodiments of the present invention, it is determined whether the transmission data amount of image data to be transmitted is larger than the limit capacity of the mail server before an actual transmission of the image data. Further, when the transmission data amount of the image data exceeds the limit capacity of the mail server, automatic processing is performed so that an electronic mail including image data can be transmitted. Accordingly, the user does not require an extra time.

Further, by combining the first embodiment through the fourth embodiment of the present invention, image data having a large transmission data amount can be securely transmitted.

Further, although, in the embodiment described above, the IFAX 101 is used as an electronic mail communication apparatus, it is not necessary that the electronic mail communication apparatus is the IFAX 101. Rather, it can be any electronic mail communication apparatus that communicates through a kind of server.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

This application is based on the Japanese Patent Application No.2000-174954 filed on Jun. 12, 2000, entire content of which is expressly incorporated by reference herein.

What is claimed is:

1. An electronic mail communication apparatus transmitting an e-mail to a destination via a mail server, the electronic mail communication apparatus comprising:
   a scanner configured to scan image data;
   a memory configured to store a limit capacity of the mail server, the limit capacity indicating a maximum data amount that the mail server can store for one e-mail transmission; and
   a controller configured to convert the image data into data for Internet transmission, to attach the converted data to the e-mail, and to transmit, to the destination, the e-mail to which the converted data is attached, via the mail server,
   the controller being further configured to compare the data amount of the e-mail to which the converted data is attached with the limit capacity of the mail server, and to notify a user of the electronic mail communication apparatus of an excess of the data amount of the e-mail to which the converted data is attached over the limit capacity of the mail server when the data amount of the e-mail to which the converted data is attached exceeds the limit capacity of the mail server.

2. The electronic mail communication apparatus according to claim 1 further comprises a speaker which notifies a user of the electronic mail communication apparatus of an excess of the data amount of the e-mail to which the converted data is attached over the limit capacity of the mail server, via a sound.

3. The electronic mail communication apparatus according to claim 1 further comprises a display which notifies a user of the electronic mail communication apparatus of an excess of the data amount of the e-mail to which the converted data is attached over the limit capacity of the mail server.

4. The electronic mail communication apparatus according to claim 1, wherein the mail server comprises at least a transmitting mail server and a receiving mail server, and the maximum data amount comprises a smaller of a data amount that the transmitting mail server can store and a data amount that the receiving mail server can store.

5. The electronic mail communication apparatus according to claim 1, the scanner being distinct from the mail server.

6. An electronic mail communication apparatus transmitting an e-mail to a destination via a mail server, the mail server being distinct from the electronic mail communication apparatus, the electronic mail communication apparatus comprising:
   a scanner configured to scan image data;
   a memory configured to store a limit capacity of the mail server, the limit capacity indicating a maximum data amount that the mail server can store for one e-mail transmission; and
   a controller configured to convert the image data into data for Internet transmission, to attach the converted data to the e-mail, and to transmit, to the destination, the e-mail to which the converted data is attached, via the mail server, the controller being further configured to compare the data amount of the e-mail to which the converted data is attached with the limit capacity of the mail server, to divide the image data into a plurality of pieces when the data amount of the e-mail to which the converted data is attached exceeds the limit capacity of the mail server, to convert the divided image data into data for the Internet transmission, to attach each of the divided and converted data to an e-mail, and to transmit, to the destination, each e-mail to which the divided and converted data is attached, via the mail server.

7. The electronic mail communication apparatus according to claim 6, the scanner being distinct from the mail server.

8. An electronic mail communication apparatus transmitting an e-mail to a destination via a mail server, the electronic mail communication apparatus comprising:

a scanner configured to scan image data;

a memory configured to store a limit capacity of the mail server, the limit capacity indicating a maximum data amount that the mail server can store for one e-mail transmission; and a controller configured to convert the image data into data for Internet transmission, to attach the converted data to the e-mail, and to transmit, to the destination, the e-mail to which the converted data is attached, via the mail server, the controller being further configured to compare the data amount of the e-mail to which the converted data is attached with the limit capacity of the mail server, to reduce the data amount of the image data by changing a resolution of the image data when the data amount of the e-mail to which the converted data is attached exceeds the limit capacity of the mail server, to convert the reduced image data into data for the Internet transmission, to attach the converted data to the e-mail, and to transmit, to the destination, the e-mail to which the converted data is attached, via the mail server.

9. The electronic mail communication apparatus according to claim 8, the scanner being distinct from the mail server.

10. An electronic mail communication apparatus being connected to a plurality of mail servers and transmitting an e-mail to a destination via one mail server of the plurality of the mail servers, the one mail server being designated for the transmission of the electronic mail communication apparatus, the electronic mail communication apparatus comprising:

a scanner configured to scan image data;

a memory configured to store a limit capacity and an IP address corresponding to each of the plurality of the mail servers, the limit capacity indicating a maximum data amount that the mail server can store; and a controller configured to convert the image data into data for Internet transmission, to attach the converted data to the e-mail, and to transmit, to the destination, the e-mail to which the converted data is attached, via the designated mail server, the controller being further configured to compare the data amount of the e-mail to which the converted data is attached with the limit capability of the designated mail server, to select another mail server that has a capacity to store the image data when the data amount of the e-mail to which the converted data is attached exceeds the limit capacity of the designated mail server, and to transmit, to the destination, the e-mail to which the converted data is attached via the another mail server, based on the IP address corresponding to the another mail server.

11. The electronic mail communication apparatus according to claim 10, the scanner being distinct from the plurality of mail servers.

12. An electronic mail communication method for transmitting image data to a destination via a mail server, the electronic mail communication method comprising:

storing a limit capacity of the mail server, the limit capacity indicating a maximum data amount that the mail server can store for one e-mail transmission;

scanning image data;

converting the image data into data for Internet transmission;

attaching the converted data to the e-mail;

transmitting, to the destination, the e-mail to which the converted data is attached, via the mail server;

comparing the data amount of the e-mail to which the converted data is attached with the limit capacity of the mail server before the e-mail to which the converted data is attached is transmitted to the destination via the mail server;

notifying a user of an excess of the data amount of the e-mail to which the converted data is attached over the limit capacity of the mail server when the data amount of the e-mail to which the converted data is attached exceeds the limit capacity of the mail server.

13. The electronic mail communication method according to claim 12, the scanning not being performed at the mail server.

14. An electronic mail communication method for transmitting image data to a destination via a mail server, the electronic mail communication method comprising:

storing a limit capacity of the mail server, the limit capacity indicating a maximum data amount that the mail server can store for one e-mail transmission;

scanning image data;

comparing the data amount of the e-mail to which the converted data is attached with the limit capacity of the mail server;

dividing the image data into a plurality of pieces when the data amount of the e-mail to which the converted data is attached exceeds the limit capacity of the mail server, the dividing not being performed at the mail server;

converting the divided image data into data for the Internet transmission;

attaching each of the divided and converted data to an e-mail;

transmitting, to the destination, the e-mail to which the divided and converted data is attached, via the mail server.

15. The electronic mail communication method according to claim 14, the scanning not being performed at the mail server.

16. An electronic mail communication method for transmitting image data to a destination via a mail server, the electronic mail communication method comprising:

storing a limit capacity of the mail server, the limit capacity indicating a maximum data amount that the mail server can store for one e-mail transmission;

scanning image data;

comparing the data amount of the e-mail to which the converted data is attached with the limit capacity of the mail server;

reducing the data amount of the image data by changing a resolution of the image data when the data amount of the e-mail to which the converted data is attached exceeds the limit capacity of the mail server;

converting the reduced image data into data for the Internet transmission;

attaching the converted data to the e-mail; and transmitting, to the destination, the e-mail to which the converted data is attached, via the mail server.

17. The electronic mail communication method according to claim 16, the scanning not being performed at the mail server.

18. An electronic-mail communication method for transmitting image data to a destination via one mail server of a plurality of mail servers, the one mail server being designated for the transmission, the electronic mail communication method comprising:

storing a limit capacity and an IP address corresponding to each of the plurality of the mail servers, the limit capacity indicating a maximum data amount that the mail server can store;

scanning image data;

converting the image data into data for Internet transmission;

attaching the converted data to the e-mail;

transmitting, to the destination, the e-mail to which the converted data is attached via the mail server;

comparing the data amount of the e-mail to which the converted data is attached with the limit capability of the designated mail server;

selecting another mail server that has a capacity to store the image data when the data amount of the e-mail to which the converted data is attached exceeds the limit capacity of the designated mail server;

transmitting, to the destination, the e-mail to which the converted data is attached via the another mail server, based on the IP address corresponding to the another mail server.

19. The electronic mail communication method according to claim 18, the scanning not being performed at any of the plurality of mail servers.

* * * * *